Nov. 21, 1939.  C. NURNBERG  2,180,995
HYDROMETER
Filed Dec. 14, 1938
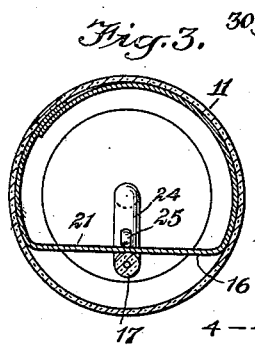
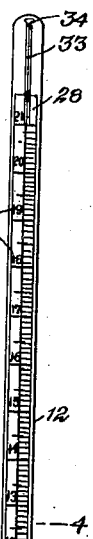
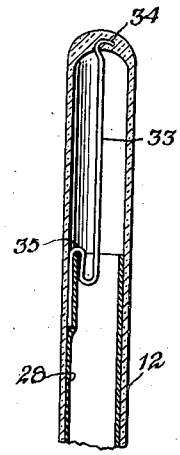
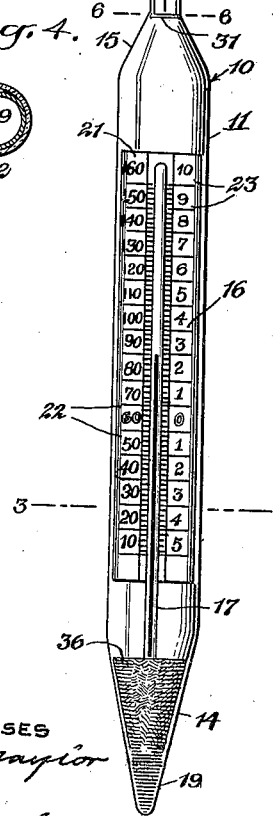
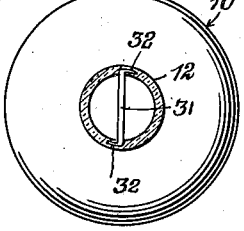
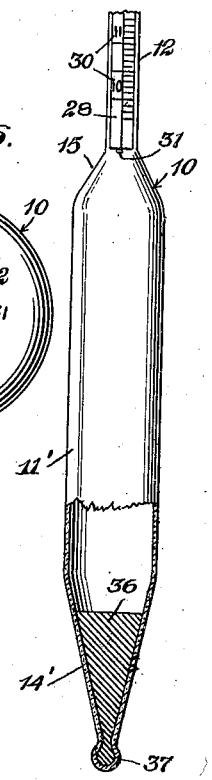
INVENTOR
Charles Nurnberg
BY
Munn, Anderson & Liddy
ATTORNEYS
WITNESSES Patented Nov. 21, 1939

2,180,995

UNITED STATES PATENT OFFICE 2,180,995

HYDROMETER

Charles Nurnberg, Brooklyn, N. Y.

Application December 14, 1938, Serial No. 245,644

3 Claims. (Cl. 265—46)

This invention relates to improvements in hydrometers for testing the specific gravity of a liquid.

It is an object of this invention to provide an improved hydrometer which is of relatively simple and inexpensive construction, which is accurate and legible and which, even though it is a delicate instrument, will last for many years and will maintain its accuracy and legibility if subjected to average reasonable care.

Instruments of this type have had many disadvantages. Thus, even though the instruments were accurate when new, they would soon become inaccurate due to a shifting of the gauge or scale or due to the coiling or charring of the paper upon which the gauge or scale was printed. In some instances the ballast or weighting material employed in the instrument would shift and cause difficulty. Also, in hydrometers which employed thermometers to provide for temperature corrections of the specific gravity readings, the gauges or scales of the thermometers would shift relative to the capillary tubes causing an inaccuracy in the temperature reading.

It is a particular object of this invention to overcome the difficulties heretofore encountered and to provide an improved instrument of the above character in which the ballast is firmly anchored and the gauges or scales are formed upon material which will not char or warp and are securely held against accidental displacement.

A further object is the provision of an improved scale member for instruments of this character which not only is legible and accurate and will not char or warp but which also automatically compensates for incidental variations in the size of instruments so as to properly fit the instruments despite such incidental variations.

In the accompanying drawing—

Fig. 1 is an elevational view of a hydrometer embodying my invention;

Fig. 2 is a longitudinal sectional view of the instrument;

Figs. 3 and 4 are sectional views on the lines 3—3 and 4—4 respectively of Fig. 1;

Fig. 5 is an enlarged longitudinal sectional view of the upper end of the instrument;

Fig. 6 is a sectional view on the line 6—6 of Fig. 1; and

Fig. 7 is a fragmentary view partially in section of the lower end of a modified form of hydrometer embodying my invention.

My improved hydrometer preferably comprises a floating hollow body indicated generally at 10 which is preferably formed of glass or some similar transparent material having a fusing or melting point higher than the temperature of the liquid to be tested. The glass body may be made in any suitable manner as for instance by blowing in a mold.

In the preferred form of my invention shown in the first six figures of the drawing the hydrometer body preferably comprises an enlarged thermometer section 11 formed at the lower end of the instrument and a smaller specific gravity reading section in the form of an upwardly projecting stem 12. The thermometer section tapers to a point at its lower end as indicated at 14 and at its upper end it is formed with a tapered collar 15 which merges with the stem 12.

Inside of the thermometer section I provide a thermometer 16 which comprises a capillary tube 17 formed of glass and having a flared bell-shaped apron at its lower end as indicated at 18 which is fused to the inside of the glass body in the tapered portion thereof a short distance from the end. The flared apron thus forms sealing engagement with the inside of the tapered portion of the glass body so as to form a small reservoir 19 for the mercury or other thermo-sensitive fluid employed in the thermometer. The capillary tube 17 thus communicates at its lower end with the reservoir and the thermo-sensitive fluid is caused to rise and fall in the tube in the usual manner in response to variations in temperature. In the tapered portion of the body a short distance above the reservoir the capillary tube 17 is preferably formed with a bulbous enlargement 20 which serves to anchor the ballast or weighting material in the lower end of the body as will be later described.

Disposed in the thermometer portion behind the capillary tube is a scale member 21 containing the graduations or temperature markings for indicating in cooperation with the thermo-sensitive fluid the temperature of the liquid being tested. This member takes the form of a relatively thin sheet of metal such as aluminum, which is light in weight, resilient, and has a relatively low coefficient of expansion and which is rolled into cylindrical form having one flat side disposed immediately behind the capillary tube as shown most clearly in Fig. 3. The flattened face of the rolled sheet metal is provided with a series of markings or graduations 22 for indicating the temperature and also with a series of markings 23 for indicating the corrections to be made in the specific gravity readings at various temperatures of the liquid being tested as will be more fully described. These scales are arranged in conventional fashion and the scales illustrated are those commonly employed in a hydrometer used for testing the specific gravity of petroleum. In instruments of this character the specific gravity scale is usually arranged so as to correctly show the specific gravity of the liquid at 60 degrees Fahrenheit. Accordingly the thermometer scale 23 is adapted to provide corrections where the temperature varies above or below 60 degrees Fahrenheit.

In order to hold the metal scale member 21 from shifting I provide the capillary tube with a double bend or offset portion 24 and with a glass projection or globule 25 so that the lower end of the scale member may rest thereon as illustrated and be held against downward displacement. At its upper end, the capillary tube is formed with a tapered hooked portion 26 which projects through an aperture 27 formed in the scale member as shown most clearly in Fig. 2. It will thus be seen that the scale member is securely held between the hooked portion 26 and the projecting globule 25 formed on the capillary tube and in this way accidental displacement of the gauge or scale relative to the capillary tube is effectively prevented.

In an instrument of this character it is necessary to provide a certain amount of ballast or weight to cause it to float at the proper level to accurately indicate the specific gravity of the liquid on the gauge provided in the instrument and also to hold the tapered end pointing downwardly. For this purpose a metal, usually bismuth or cobalt or an alloy thereof, having a low fusing point is usually employed. The metal is inserted in molten form into the tapered portion 14 of the body as shown at 36 so that it surrounds the enlargement 20 formed on the capillary tube. In this way when the metal ballast hardens it will be effectively held in position by means of the glass enlargement.

In using the instrument it is inserted in the liquid and the ballast causes the lower end thereof to depend downwardly with the stem 12 projecting upwardly above the surface of the liquid. A scale is provided inside of the stem 12 and the marking or graduation on the scale which appears at the surface of the liquid indicates the specific gravity reading. In accordance with my present invention I form the specific gravity scale on an improved type of scale member 28 which is similar to the scale member used in the thermometer in that it is formed of thin sheet metal, preferably a light, resilient metal having a relatively low coefficient of expansion such as aluminum. The sheet metal scale member is rolled into cylindrical form and where the circumference of the stem 12 is relatively small the lateral edges of the member may be arranged in overlapping relationship as shown at 29 in Fig. 4. In constructing instruments of this character the inside diameter of the stem will vary slightly in different instruments. Due to the fact that the sheet metal is resilient it will be appreciated that it will automatically accommodate itself to the inside size of the stem. This is a great advantage because the same standard scale member 28 can be used for all instruments of this type and will fit the instrument properly. The member is provided with suitable graduations and markings for indicating the specific gravity of the liquid being tested as shown at 30. So as to hold the scale member 28 against accidental displacement I provide a cross strip 31 preferably formed of glass and fused to the two sides of the stem at the lower end thereof as shown at 32. It will be seen that the scale member rests on the strip 31 and is thus prevented from shifting downwardly. Similarly I provide means at the upper end of the scale member to prevent it from accidentally shifting upwardly. For this I provide an index member 33 likewise preferably formed of glass which is fused at its upper end into the top of the stem as shown most clearly at 34. The index member depends downwardly and is formed with an inverted U-shaped portion 35 which engages the top of the scale member 28 and prevents it from shifting upwardly. As shown most clearly in Figs. 2 and 5 the lower end of the index member 33 terminates at the top graduation of the scale. Should there be any shifting in the scale member this will be immediately apparent as the lower end of the index member will no longer register with the top graduation of the scale.

As previously stated the glass body member may be formed by being blown in a mold. In making my instrument the thermometer portion may first be assembled and the metallic ballast may be placed in the lower end thereof. The stem 12 is then fused to the upper end of the thermometer portion and the scale member assembled therein. The upper end of the stem 12 is permitted to remain open until after the instrument has been tested and in this way additional ballast may be inserted when it is required to cause the instrument to function accurately. When the instrument has been accurately balanced the upper end of the stem is fused closed with the index 33 depending downwardly with the portion 35 engaging the top of the scale member in the manner described and shown. In fusing the top of the stem closed it is important that none of the glass be lost as this would destroy the accuracy of the instrument.

In using an instrument of the type just described it is inserted in the petroleum or other liquid to be tested. The ballast causes the thermometer portion to depend downwardly and the stem 12 to project upwardly above the surface of the liquid. The graduations 30 on the scale member 28 are so calibrated that the graduation appearing at the surface level of the liquid indicates the specific gravity of the liquid. It will be appreciated that specific gravity varies with variations in the temperature of the liquid. Accordingly the scale is usually arranged to indicate the specific gravity at a particular temperature, as, for instance, 60 degrees Fahrenheit. The instrument is permitted to remain in the liquid long enough for the thermometer to register the temperature thereof. By observing the temperature the operator can correct his specific gravity reading so as to accurately determine the specific gravity of the liquid in acordance with the particular temperature recorded. To facilitate the correction of the reading the scale 23 is provided. When the temperature is above 60 degrees the numeral indicated in scale 23 opposite the temperature is subtracted from the specific gravity reading and when the temperature is below 60 degrees the numeral appearing opposite the temperature is added to the specific gravity reading. The scales illustrated are standard and form no part of my invention it being understood that various types of scales may be employed.

In the modified form of instrument shown in Fig. 7 I do not employ a thermometer, the instrument merely indicating the specific gravity of the liquid. When it is desired to make a temperature correction it is necessary to employ a separate thermometer to determine the temperature of the liquid. The instrument shown in Fig. 7 is identical in all respects with the instrument shown in the first form of my invention with the exception that I do not employ a thermometer and a bulbous enlargement 37 is formed at the lower end of the body portion. Thus it will be seen that the lower portion of the body 10 is formed with a relatively enlarged section 11' corresponding to the thermometer section 11 and this tapers at one end as indicated at 14', the tapered portion in turn communicating with the bulbous enlargement 37. The metallic ballast 36 is placed in the tapered portion and in the enlarged portion 37 which provides an anchoring chamber for the ballast and after it sets or hardens it will be appreciated that it is effectively held against accidental displacement. The upper end of the portion 11' is connected by means of the tapered neck 15 to the stem 12 which is identical with the stem employed in the first form of my invention and has the scale member 28 with the graduations 30 positioned therein and held against accidental displacement in the same manner.

The modified instrument is used in exactly the same manner as the preferred form of instrument with the exception that the temperature, for temperature corrections, must be determined by means of a separate thermometer.

I have found that the scales are more legible and cause less eye strain if formed on an ivory background. Accordingly I prefer to provide the members 21 and 28 with an ivory enamel finish and with markings or graduations of contrasting color. It will be appreciated from the foregoing description and the accompanying illustrations of several embodiments of my invention that I have provided an improved hydrometer which will accurately and legibly indicate the specific gravity of the liquid being tested not only while the instrument is new but also after it has been used for some time. It will also be appreciated that the several parts of the instrument are effectively held against accidental displacement and that the scale members will not warp or char even when subjected to liquids of relatively high temperatures.

I claim—

1. A hydrometer comprising a body member having a tubular portion of relatively small diameter formed of glass, a scale member formed of relatively thin resilient sheet metal coiled in generally cylindrical form and disposed inside said tubular portion, said scale member having graduations thereon displayed through the side of the tubular portion, an index member comprising a strip of glass fused at one end to the upper end of the tubular portion and depending downwardly to a predetermined position with respect to the graduations on the scale so that shifting of the scale member will be apparent from a variation in their relative positions, said index member being formed with a curved portion engaging the upper end of the scale member to prevent it from shifting upwardly, and a supporting member for the other end of the scale member comprising a strip of glass extending across the tubular member and fused at its two ends to the sides of the tubular portion, said strip of glass engaging the lower end of the scale member and preventing it from shifting downwardly.

2. In an instrument of the character described, a hollow glass body member formed with a tapered lower end, a thermometer positioned inside the body member and comprising means forming a reservoir for a thermo-sensitive fluid in the tapered end of the body member, and a capillary tube extending upwardly in the body member and communicating at its lower end with the reservoir, said capillary tube having a bulbous enlargement formed therein above the reservoir in the tapered portion of the body member, and ballast material disposed in the tapered portion of the body member and formed around and engaging the bulbous enlargement of the capillary tube so that the ballast is held against shifting or displacement.

3. A hydrometer for testing the specific gravity of liquids comprising a hollow glass body member having a cylindrical thermometer portion with a tapered lower end and a cylindrical gravity reading portion of relatively smaller diameter extending upwardly from the thermometer portion, a scale member formed of relatively thin resilient sheet metal coiled in generally cylindrical form disposed in said gravity reading portion and having graduations formed thereon displayed through the side of the body member, an index member comprising a strip of glass fused at one end to the upper end of the gravity reading portion of the body member and depending downwardly to a predetermined point with regard to the graduations formed on said scale member so that shifting of the scale member will be apparent from a variation in their relative portions, said index member having a curved portion engaging the upper end of the scale member to prevent it from shifting upwardly, a supporting member for the other end of the scale member and comprising a strip of glass extending across the gravity reading portion of the body member and fused to the sides thereof, said strip of glass engaging the lower end of the scale member and preventing it from shifting downwardly, a thermometer disposed in the thermometer portion of the body member and comprising a capillary tube having a flared lower end sealed to the inner surface of the tapered portion adjacent the end thereof so as to form a reservoir for a thermo-sensitive fluid, said capillary tube extending upwardly in the thermometer portion of the body member and being formed with a bulbous enlargement above the reservoir, a thermometer scale member comprising a strip of sheet metal formed into a tube having a flattened side and disposed adjacent the capillary tube with the flattened side in contact therewith, said thermometer scale member having graduations on the flattened side thereof for indicating in cooperation with the thermo-sensitive fluid the temperature of the liquid being tested, said scale member being formed with an opening and said capillary tube having a hooked upper end extending through the opening to prevent the scale member from shifting, and said capillary tube having an offset portion on which the lower end of the thermometer scale member rests, and metallic ballast disposed in the tapered lower portion of the body member and surrounding and engaging the bulbous enlargement in the capillary tube, said bulbous enlargement preventing accidental shifting or displacement of the ballast.

CHARLES NURNBERG.